United States Patent [19]

Lutz et al.

[11] Patent Number: 5,009,564
[45] Date of Patent: Apr. 23, 1991

[54] CARGO CARRYING VEHICLE HAVING A MOVABLE BULKHEAD LOCATED THEREIN

[76] Inventors: David E. Lutz; David W. Lutz, both of P.O. Box 810, Carlisle, Pa. 17013

[21] Appl. No.: 415,719

[22] Filed: Oct. 2, 1989

[51] Int. Cl.$^5$ .................................................... B60P 1/00
[52] U.S. Cl. ..................................... 414/510; 414/511; 414/512; 414/513; 414/515; 414/521
[58] Field of Search ............... 414/507, 509, 510, 511, 414/512, 513, 514, 515, 516, 517, 521, 525.1, 529; 298/1 A

[56] References Cited

U.S. PATENT DOCUMENTS

| | | | |
|---|---|---|---|
| 2,218,121 | 10/1940 | Palement | 414/509 X |
| 2,298,982 | 10/1942 | Smith | 414/513 |
| 3,422,973 | 1/1969 | Longman | 414/511 X |
| 3,486,646 | 12/1969 | O'Brien et al. | 414/513 |
| 3,722,717 | 3/1973 | Stryczek | 414/510 X |
| 4,015,727 | 4/1977 | Rezac | 414/521 |
| 4,078,682 | 3/1978 | Johnson, Jr. | 414/515 X |
| 4,113,125 | 9/1978 | Schiller | 414/512 X |
| 4,260,317 | 4/1981 | Martin et al. | 414/517 |
| 4,578,015 | 3/1986 | Baldarelli et al. | 414/516 X |
| 4,627,783 | 12/1986 | De Filippi | 414/511 X |

FOREIGN PATENT DOCUMENTS

| | | | |
|---|---|---|---|
| 190397 | 6/1957 | Fed. Rep. of Germany | 414/516 |
| 61-196835 | 9/1986 | Japan | 414/510 |
| 760130 | 10/1956 | United Kingdom | 414/515 |
| 1057013 | 2/1967 | United Kingdom | 414/514 |

Primary Examiner—David A. Bucci
Assistant Examiner—Robert S. Katz
Attorney, Agent, or Firm—Oblon, Spivak, McClelland, Maier & Neustadt

[57] ABSTRACT

A cargo carrying vehicle including apparatus for unloading cargo from the vehicle by the general method of (1) shuttling a flat plate that covers a portion of the floor back and forth longitudinally and (2) preventing the cargo being unloaded from following the floor on its retract (forward) stroke by use of a movable bulkhead.

31 Claims, 8 Drawing Sheets

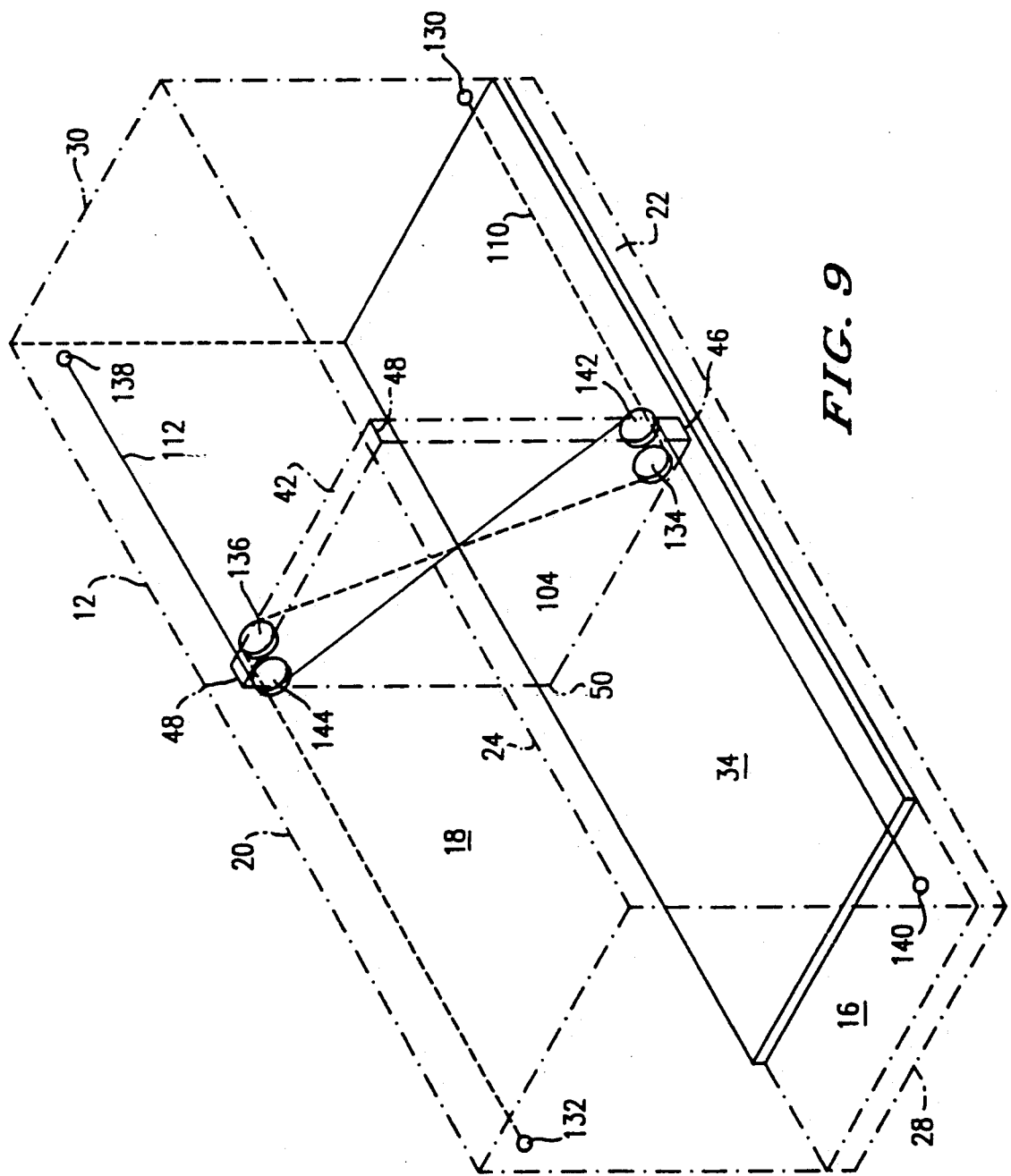

CARGO CARRYING VEHICLE HAVING A MOVABLE BULKHEAD LOCATED THEREIN

FIELD OF THE INVENTION

The invention pertains to cargo carrying vehicles having unloading means located in the interior thereof.

OBJECT OF THE INVENTION

It is the object of the invention to provide means for unloading a cargo carrying vehicle by the general method of (1) shuttling a flat plate that covers most of the floor back and forth longitudinally and (2) preventing the cargo being unloaded from following the floor on its retract (forward) stroke by means of a movable bulkhead.

SUMMARY OF THE INVENTION

In one aspect, the invention comprises a cargo carrying vehicle comprising a body, a movable support surface mounted on the internal floor of the body for movement relative thereto, first means for moving the movable support surface back and forth between a first position and a second position spaced longitudinally from the first position, a movable bulkhead mounted in the interior above the movable support surface for movement relative to the internal floor, and means for moving the movable bulkhead back and forth between a first position and a second position spaced longitudinally from its first position.

In another aspect, the invention comprises a cargo carrying vehicle comprising a body, a movable bulkhead mounted in the interior of the body for movement relative to the internal floor, means for moving the movable bulkhead back and forth between a first position and a second position spaced longitudinally from the first position, and means for stabilizing the movable bulkhead against pivotal movement relative to the internal sidewalls.

BRIEF DESCRIPTION OF THE DRAWINGS

FIG. 9 is a schematic perspective view showing a mechanism for stabilizing the bulkhead against pivotal movement about another axis.

DETAILED DESCRIPTION OF THE PRESENTLY PREFERRED EMBODIMENTS

Figure 1A:
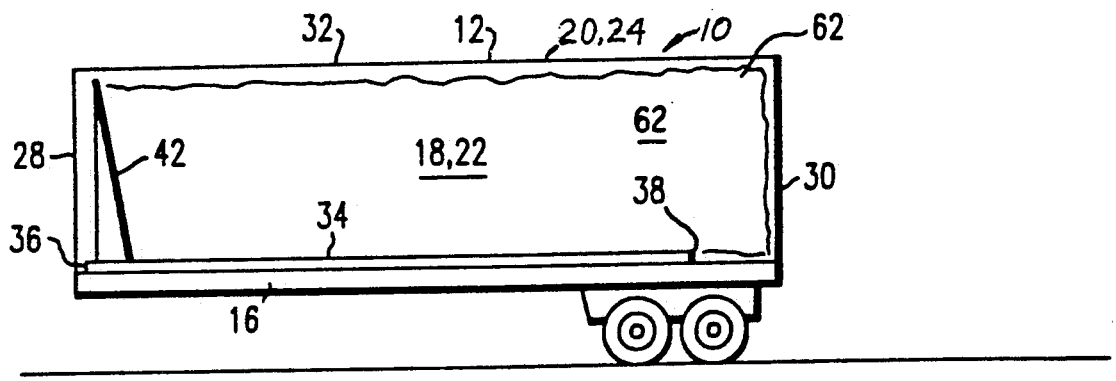
FIGS. 1(a)-1(e) are schematic side views illustrating the operation of the invention in unloading a bulk cargo.

FIGS. 1(a) through 1(e) show a cargo carrying vehicle 10 (which, in the illustrated embodiment, is a trailer, but which might be a truck or other type of cargo carrying vehicle) comprising a generally rectangular parallelepipedal body 12. The body 12 has an interior 14, an internal floor 16, a left internal sidewall 18 having an upper edge 20, a right internal sidewall 22 having an upper edge 24, a longitudinal direction 26, a front end 28, a rear end 30, and a roof 32.

A movable support surface 34 is mounted in the interior 14 on the internal floor 16 for movement relative thereto. The movable support surface 34 has a front end 36 and a rear end 38.

A means 40 for moving the movable support surface 34 back and forth between a first position and a second position spaced longitudinally from the first position towards the rear end 30 of the bottom 12 will be described hereinafter.

A movable bulkhead 42 is mounted in the interior 14 above the movable support surface 34 for movement relative to the internal floor 16. As seen in subsequent drawings, the movable bulkhead 42 has an upper right corner 44, a lower right corner 46, an upper left corner 48, and a lower left corner 50.

In one embodiment (shown, e.g., in FIG. 4), the movable bulkhead 42 comprises a front portion 52 that is generally planar in shape and that extends at least substantially from the left internal sidewall 18 to the right internal sidewall 22 and from the movable support surface 34 upwardly to the roof 32 (if there is a roof on the cargo carrying vehicle 10). To provide strength to the movable bulkhead 42, it preferably also comprises a left gusset 54 that extends from the front portion 52 toward the rear end 30 and a right gusset 56 that extends from the front portion 52 toward the rear end 30.

A means 58 for moving the movable bulkhead 42 back and forth between a first position and a second position spaced longitudinally from the first position toward the rear end 30 of the body 12 will be described hereinafter.

The movable support surface 34 preferably makes planar abutting contact with the internal sidewalls 18, 22.

Preferably, when the movable support surface 34 is in its first position, its front end 36 is adjacent the front end 28 of the body 12, and when the movable support surface 34 is in its second position, its rear end 38 is adjacent the rear end 30 of the body 12. Similarly, preferably when the movable bulkhead 42 is in its first position, it is adjacent the front end 28 of the body 12, and when the movable bulkhead 42 is in its second position, it is adjacent the rear end 30 of the body 12.

Preferably, a means 60 for temporarily anchoring the movable bulkhead 42 in fixed position relative to the internal sidewalls 18, 22 is provided, and such means are described hereinafter.

The use of the invention to unload a bulk cargo 62 will now be described with reference to FIGS. 1(a) to 1(e).

In FIG. 1(a) the body 12 contains a full load of the bulk cargo 62, the movable support surface 34 is in its first position, and the movable bulkhead 42 is in its first position.

Figure 1B:
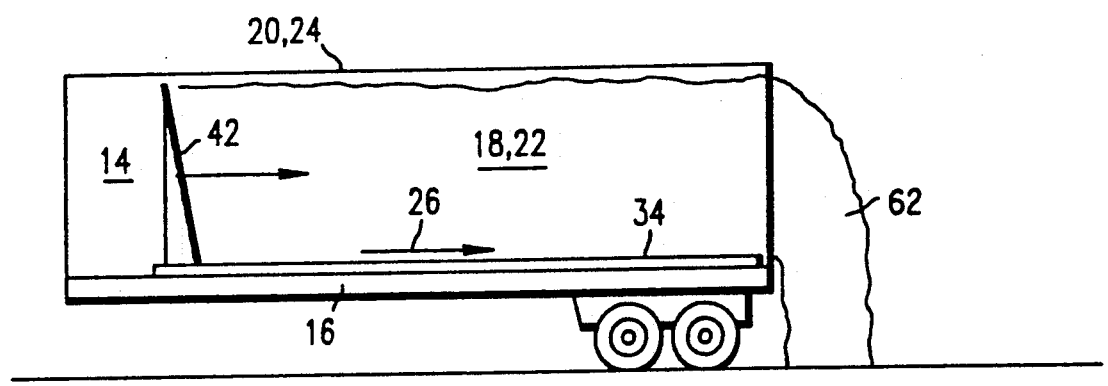

In FIG. 1(b), the movable support surface 34 has been moved to its second position, the movable bulkhead 42 has been moved toward the rear end 30 of the body 12 by the same amount, and some of the bulk cargo 62 has been forced out of the rear end 30 of the body 12.

Figure 1C:
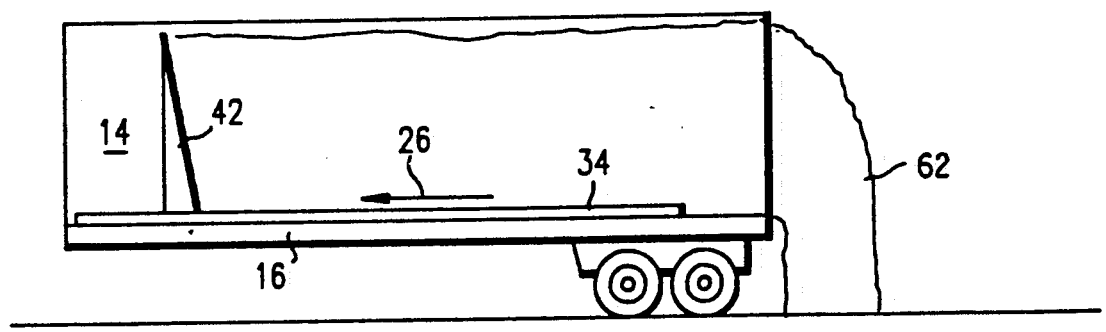

In FIG. 1(c), the movable support surface 34 has been moved back to its first position, and the movable bulkhead 42 has been kept in the same position as is shown in FIG. 1(b).

Figure 1D:
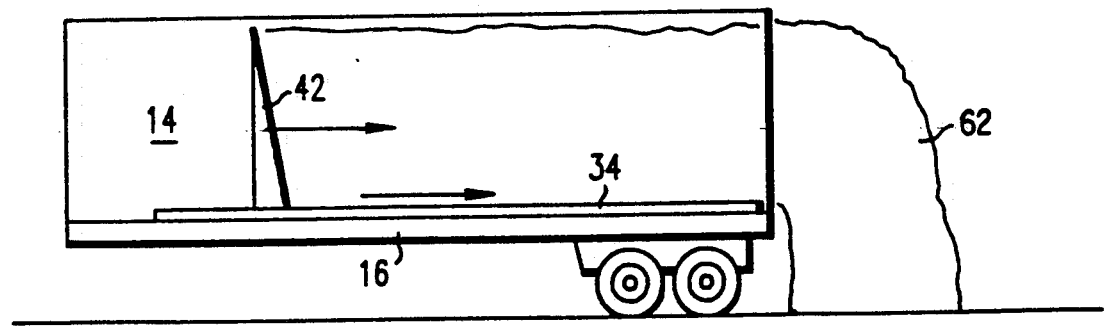

In FIG. 1(d), the movable support surface 34 has been moved to a second position, the movable bulkhead 42 has been moved toward the rear end 30 of the body 12 by the same amount, and some more of the bulk cargo 62 has been forced out of the rear end 30 of the body 12.

Figure 1E:
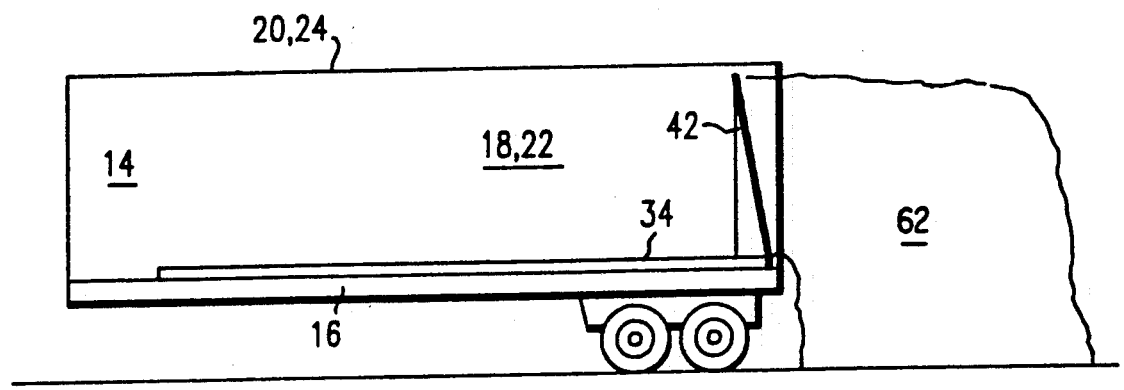

In FIG. 1(e), the movable support surface 34 has been moved to its second position, the movable bulkhead 42 has been moved to its second position, and substantially all of the bulk cargo 62 has been unloaded from the body 12.

Figure 2:
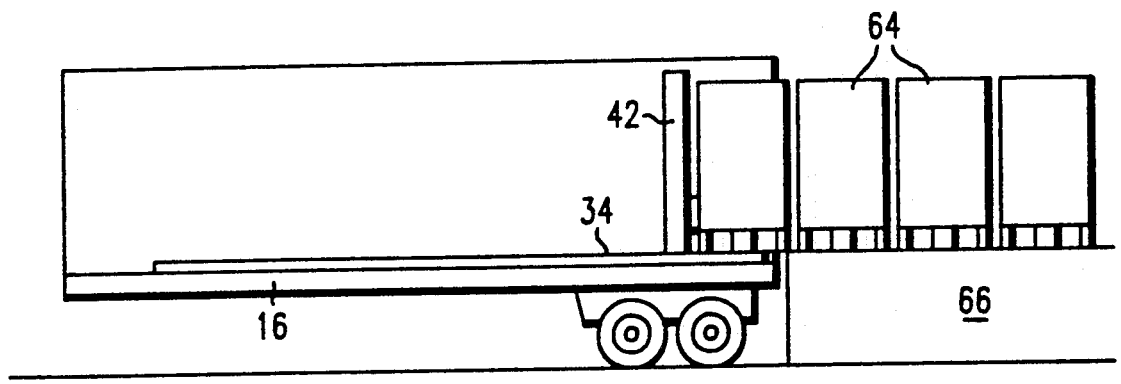
FIG. 2 is a schematic side view illustrating the operation of the invention in unloading palletized cargo containers.

FIG. 2 illustrates the use of the invention for unloading a plurality of palletized cargo containers 64 onto a loading dock 66.

Figure 3:
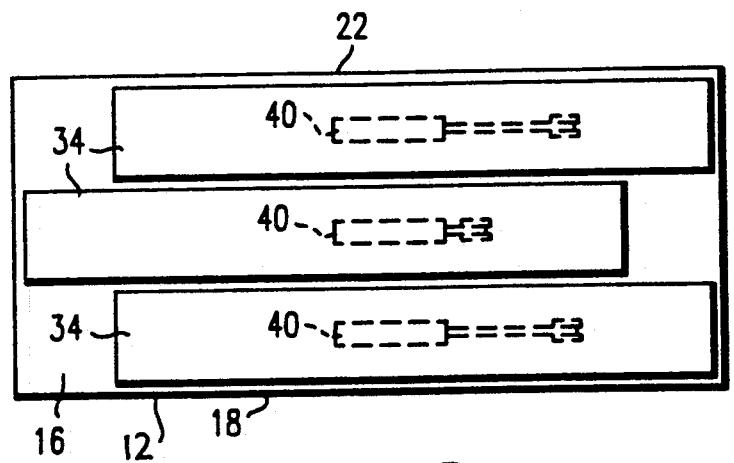
FIG. 3 is a schematic view illustrating a modification of the invention for use with particularly heavy loads.

FIG. 3 illustrates a modification of the invention for use with particularly heavy loads. In this modification, a plurality (in the illustrated embodiment, three) movable support surface 34 are mounted on the internal floor 16 of the body 12. This embodiment can also be used to independently unload parallel columns of palletized cargo containers 64.

Figure 4:
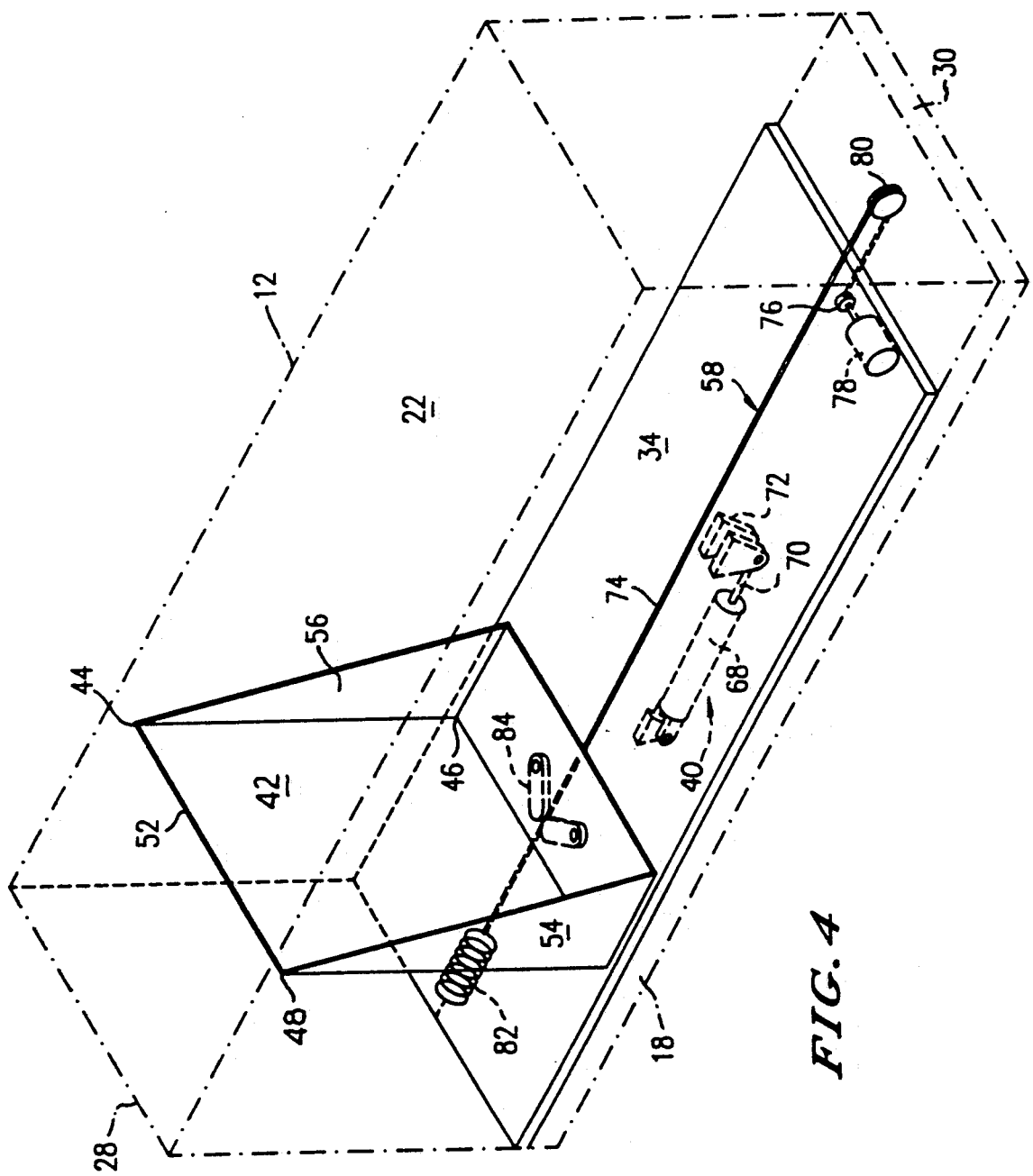
FIG. 4 is a schematic perspective view showing a first embodiment of drive means for the floor and for the bulkhead.

FIG. 4 illustrates one embodiment of the means 40 and one embodiment of the means 58.

The embodiment of the means 40 illustrated in FIG. 4 comprises a hydraulic cylinder 68 mounted on the underside of the body 12. The hydraulic cylinder 68 has a piston rod 70 attached to a pair of clevises 72 that extend through the internal floor 16 and that, in turn, are attached to the underside of the movable support surface 34. Thus, when the piston rod 70 is retracted, the movable support surface 34 is in its first position, and when the piston rod 70 is extended, the movable support surface 34 is in its second position.

The embodiment of the means 58 illustrated in FIG. 4 comprises an inextensible cable 74 having a first end attached to a drum 76 rotated by a motor 78 mounted on the underside of the body 12. The inextensible cable 74 is passed around an idler sheave 80 mounted on the body 12 and passed longitudinally along the upper surface of the movable support surface 34 (preferably in a groove, not shown, to minimize contact with the cargo). The second end of the inextensible cable 74 is connected to a first end of a tension spring 82, the other end of which is connected to the front end 28 of the body 12. If the body 12 is, for instance, 45 feet long, the tension spring 82 should be capable of extending from, e.g., 1 foot in length to, e.g., 44 feet in length.

Pivotally mounted on the bottom of the movable bulkhead 42 are a pair of grippers 84. When the grippers 84 are pivoted toward each other (by means not shown), they grip the inextensible cable 74 between them, and the movable bulkhead 42 is moved with the inextensible cable 74 —either toward the rear end 30 of the body 12 by operation of the motor 78 or toward the front end 28 of the body 12 by the force of the spring 82. When the grippers 84 are pivoted away from each other (by means not shown), the movable bulkhead 42 can be moved relative to the inextensible cable 74.

Figure 5:
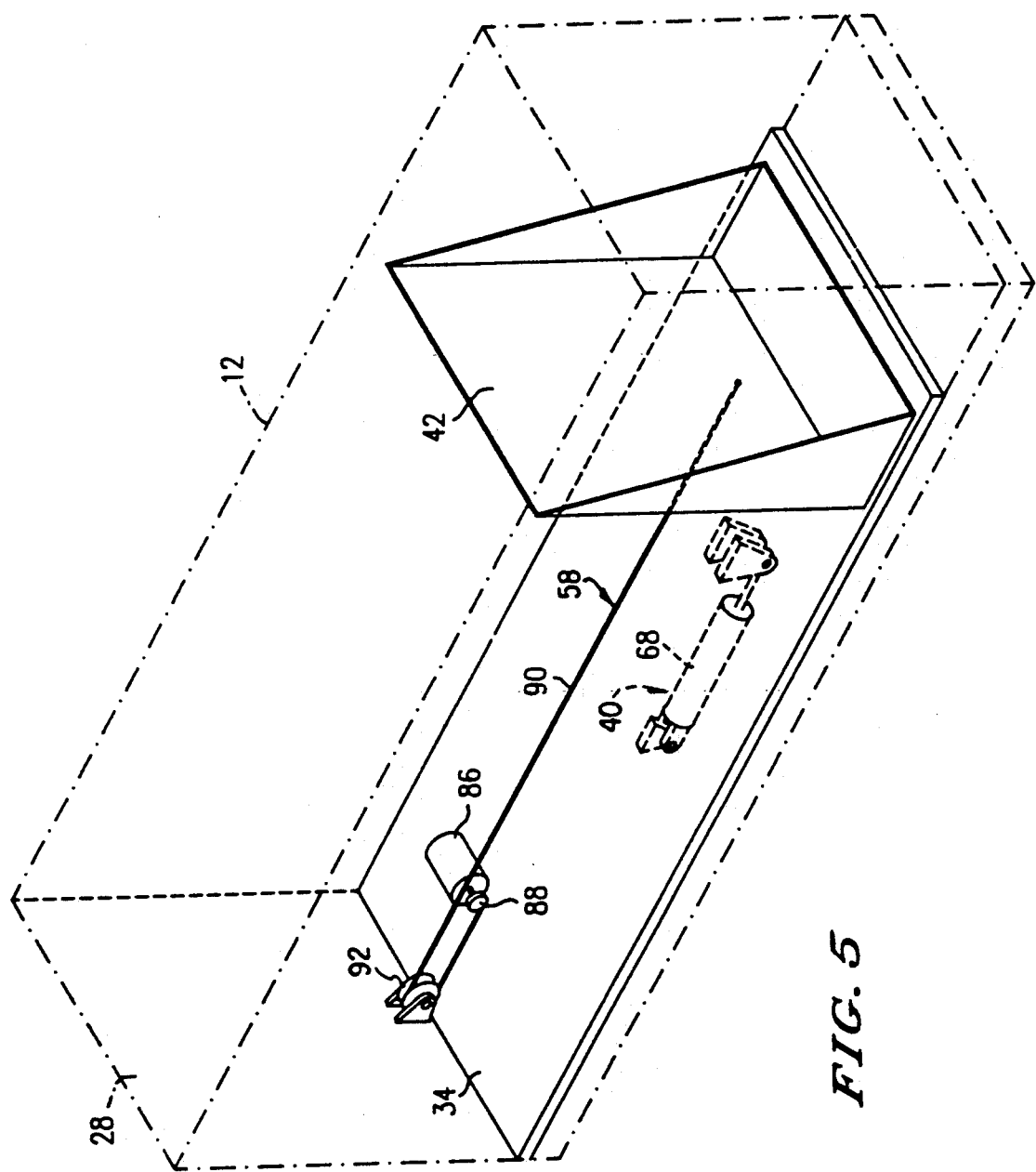
FIG. 5 is a schematic perspective view showing a second embodiment of drive means for the bulkhead.

FIG. 5 illustrates the same means 40 as is shown in FIG. 4 and a different means 58. In FIG. 5, the spring 82 is replaced by a motor 86 mounted on the underside of the body 12. The motor 86 rotates a drum 88 to which one end of an inextensible cable 90 is attached. The inextensible cable 90 is passed around an idler sheave 92 mounted on the front end 22 of the body 12, and the other end of the inextensible cable 90 is attached to the front side of the movable bulkhead 42. With this embodiment, the inextensible cable 74 (not shown in FIG. 5) is attached to the rear side of the movable bulkhead 42, the movable bulkhead 42 is moved toward the rear end 30 of the body 22 by the motor 78 (not shown in FIG. 5), and the movable bulkhead 42 is moved toward the front end 28 of the body 12 by the motor 86.

Figure 6:
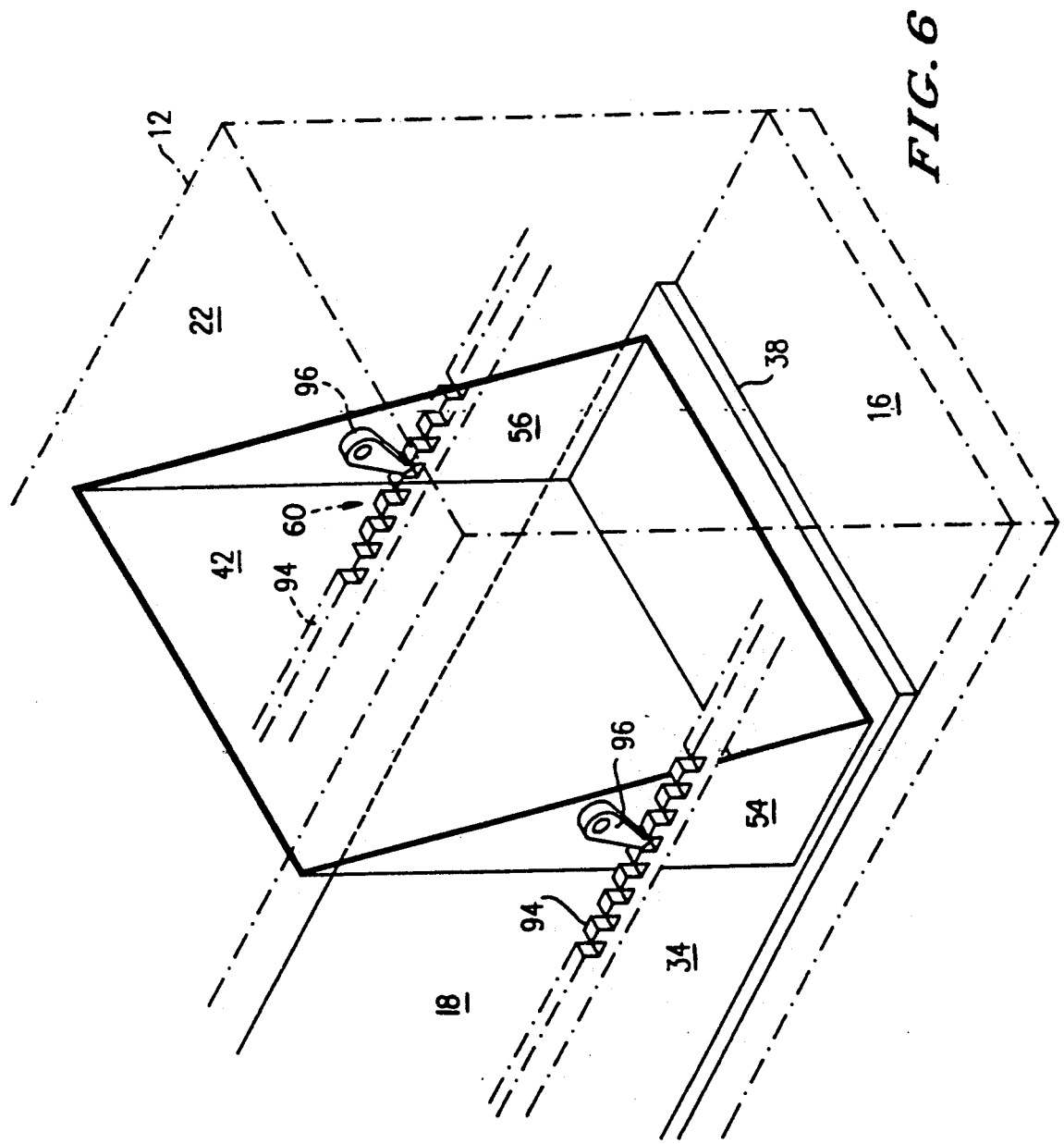
FIG. 6 is a schematic perspective view showing an embodiment of a mechanism for temporarily anchoring the bulkhead to the sidewalls.

FIG. 6 illustrates the means 60 for temporarily attaching the movable bulkhead 42 to the internal sidewalls 18, 22 during movement of the movable support surface 34 toward the front end 28 of the body 12. These means comprise a linear ratchet 94 mounted on each internal sidewall 18, 22 and a pawl 96 mounted on each gusset 54, 56. When the pawls 96 are pivoted into the position shown in FIG. 6 (by means not shown), the movable bulkhead 42 is temporarily anchored to the internal sidewalls 18, 22. However, when the pawls 96 are pivoted away from the linear ratchets 94 (by means not shown), the movable bulkhead 42 can move relative to the internal sidewalls 18, 22.

Figure 7:
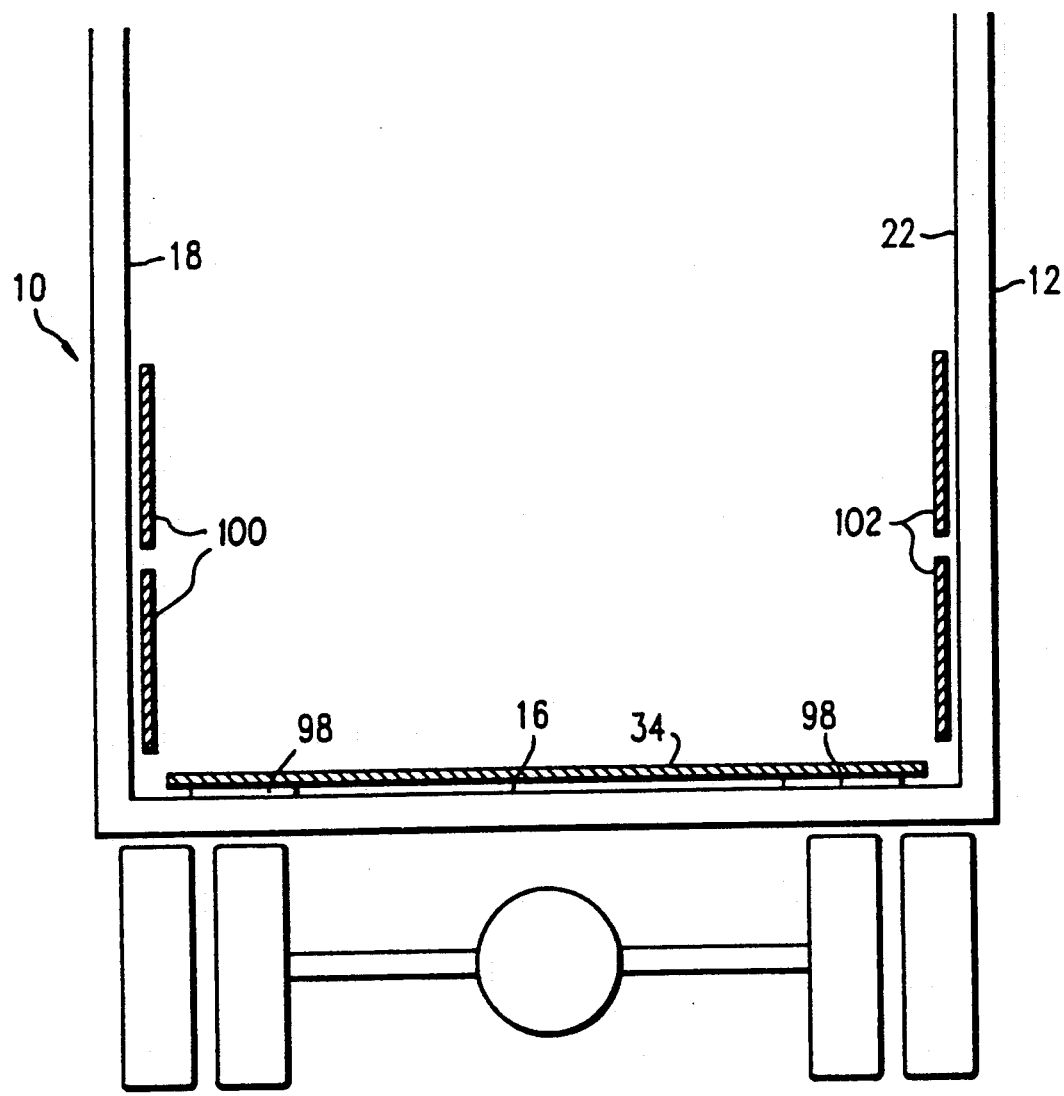
FIG. 7 is a schematic end view of a modification of the invention for use with particularly heavy loads.

FIG. 7 is a schematic end view of a modification of the invention for use with particularly heavy loads. This modification has the movable support surface 34 mounted on a plurality of rollers 98 on the internal floor 16. In addition, it has a plurality of vertically spaced left movable support surfaces 100 mounted on the left internal sidewalls 18 for movement relative thereto and a plurality of vertically spaced right movable support surfaces 102 mounted on the right internal wall 22 for movement relative thereto. Means (not shown) such as the means 40 previously described can be provided for moving the left and right movable support surfaces 100 and 102 back and forth between two longitudinally spaced positions to help in unloading cargo from the cargo carrying vehicle 10.

Figure 8:
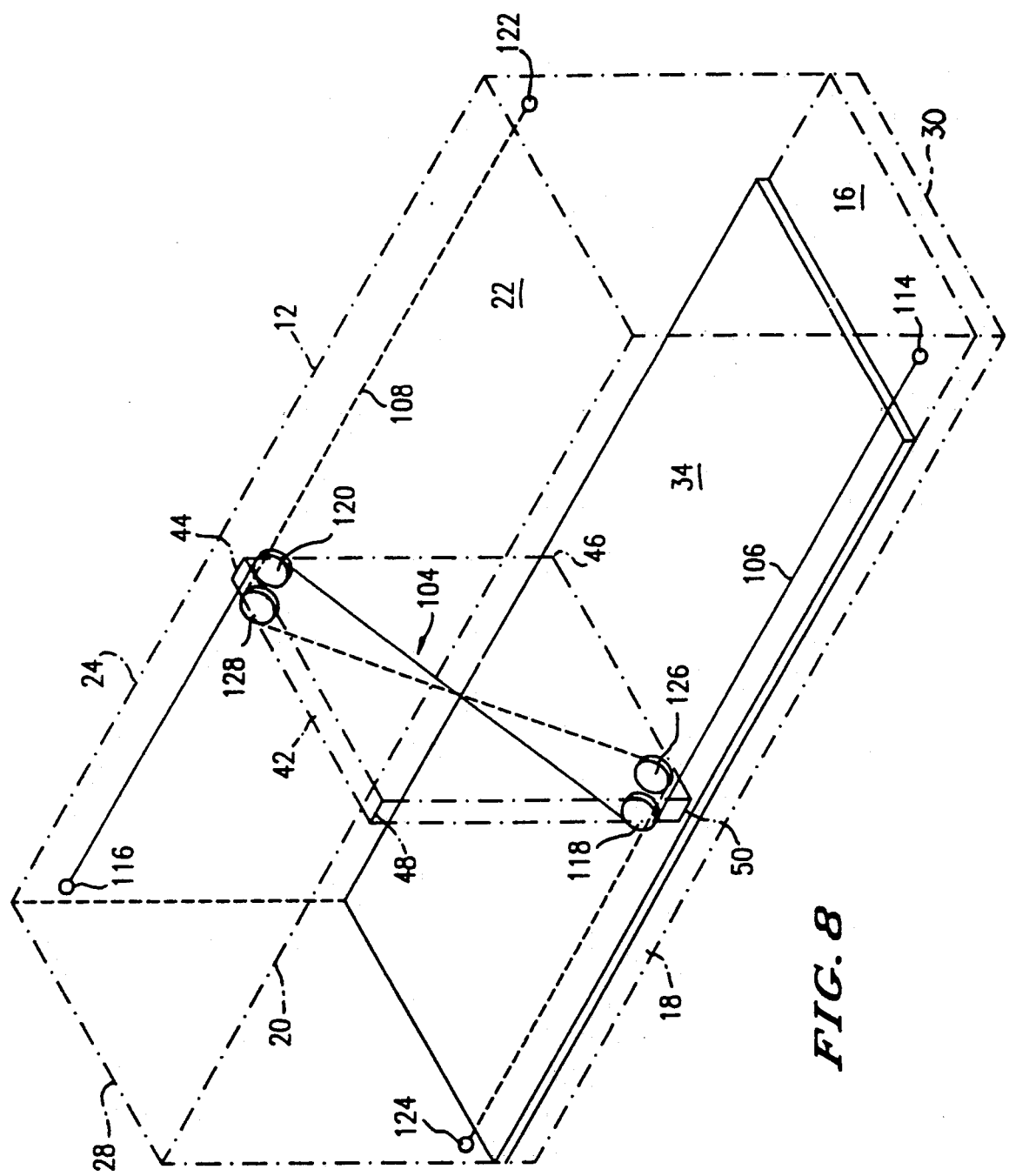
FIG. 8 is a schematic perspective view showing a mechanism for stabilizing the bulkhead against pivotal movement about one axis.

FIGS. 8 and 9 are schematic perspective views showing a means 104 for stabilizing the movable bulkhead 42 against pivotal motion relative to the internal sidewalls 18, 22. While the means 104 were originally developed for use with the movable support surface 34, it should of course be realized that the means 104 can be used with any longitudinally movable bulkhead 42 in a generally similar environment.

The means 104 illustrated in FIGS. 8 and 9 comprise a first inextensible cable 106, a second inextensible cable 108, a third inextensible cable 110, and a fourth inextensible cable 112.

As shown in FIG. 8, the first inextensible cable 106 has a first end 114 mounted on the body 12 adjacent to the rear end of the body 12, on or adjacent the internal floor 16, and adjacent the left internal sidewall 18; has a second end 116 mounted on the body 12 adjacent the front end 28 of the body 12 and adjacent the upper edge 24 of the right internal sidewall 22; and is trained over a first pulley 118 mounted on the movable bulkhead 42 adjacent its lower left corner 50 and a second pulley 120 mounted on the movable bulkhead 42 adjacent its upper right corner 44. The second inextensible cable 108 has a first end 122 mounted on the body 12 adjacent the rear end 30 of the body 12 and adjacent the upper edge 24 of the right internal sidewall 22; has a second end 124 mounted on the body 12 adjacent the front end 28 of the trailer body 12, on or adjacent the internal floor 16 and adjacent the left internal sidewall 18; and is trained over a third pulley 126 mounted on the movable bulkhead 42 adjacent its lower left corner 50 and a fourth pulley 128 mounted on the movable bulkhead 42 adjacent its upper right corner 44. The first and second inextensible cables 106 and 108 together stabilize the movable bulkhead 42 against pivotal movement about an axis running through the lower right corner 46 and the upper left corner 48 of the movable bulkhead 42.

As shown in FIG. 9, the third inextensible cable 112 has a first end 130 mounted on the body 12 adjacent the rear end of the body 12, on or adjacent the internal floor 16, and adjacent the right internal sidewall 22; has a second end 132 mounted on the body 12 adjacent the front end 28 of the body 12 and adjacent the upper edge 20 of the left internal sidewall 18; and is trained over a fifth pulley 134 mounted on the movable bulkhead 42 adjacent its lower right corner 46 and a sixth pulley 136 mounted on the movable bulkhead 42 adjacent its upper left corner 48. The fourth inextensible cable 112 has a first end 138 mounted on the body 12 adjacent the rear end 30 of the body 12 and adjacent the upper edge 20 of the left internal sidewall 18; has a second end 140 mounted on the body 12 adjacent the front end 28 of the body 12, on or adjacent the internal floor 16, and adjacent the right internal sidewall 22; and is trained over a seventh pulley 142 mounted on the movable bulkhead 42 adjacent its lower right corner 46 and an eighth pulley 144 mounted on the movable bulkhead 42 adjacent its upper left corner 48. The third and fourth inextensible cables 110 and 112 together stabilize the movable bulkhead 42 against pivotal movement about an axis running through the lower left corner 50 and the upper right corner 44 of the movable bulkhead 42.

Preferably, the first pulley 118 and the third pulley 126 are coaxial; the second pulley 120 and the fourth pulley 128 are coaxial; the fifth pulley 134 and the seventh pulley 142 are coaxial; and the sixth pulley 136 and the eighth pulley 144 are coaxial.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the U.S. is:

1. A cargo carrying vehicle comprising:
    (a) a body having an interior, an internal floor, a left internal sidewall having an upper edge, a right internal sidewall having an upper edge, a longitudinal axis, a front end, and a rear end;
    at least one movable support surface mounted on said internal floor for movement relative thereto, said movable support surface having a front end and a rear end;
    (c) first means for moving said movable support surface back and forth between a first position and a second position spaced longitudinally from said first position toward said read end of said body;
    (d) a movable bulkhead mounted in said interior above said movable support surface for movement relative to said internal floor, said movable bulkhead having an upper right corner, a lower right corner, an upper left corner, and a lower left corner;
    (e) second means for moving said movable bulkhead back and forth between a first position and a second position spaced longitudinally from said first position toward said rear end of said body; and
    (f) third means for stabilizing said movable bulkhead against pivotal motion relative to said internal sidewalls, said third means comprising:
        (i) a first inextensible cable that:
            (A) has a first end mounted on said body adjacent said rear end of said body, on or adjacent said internal floor, and adjacent said left internal sidewall;
            (B) has a second end mounted on said body adjacent said front end of said body and adjacent said upper edge of said right internal sidewall; and
            (C) is trained over a first pulley mounted on said movable bulkhead adjacent its lower left corner and a second pulley mounted on said movable bulkhead adjacent its upper right corner;
        (ii) a second inextensible cable that:
            (A) has a first end mounted on said body adjacent aid rear end of said body and adjacent said upper edge of said right internal sidewall;
            (B) has a second end mounted on said body adjacent said first end of said body, on or adjacent said internal floor, and adjacent said left internal sidewall; and
            (C) is trained over a third pulley mounted on said movable bulkhead adjacent its lower left corner and a fourth pulley mounted on said movable bulkhead adjacent its upper right corner;
        (iii) a third inextensible cable that:
            (A) has a first end mounted on said body adjacent said rear end of said body, on or adjacent said internal floor, and adjacent said right internal sidewall;
            (B) has a second end mounted on said body adjacent said front end of said body and adjacent said upper edge of said left internal sidewall; and
            (C) is trained over a fifth pulley mounted over said movable bulkhead adjacent its lower right corner and a sixth pulley mounted on said movable bulkhead adjacent its upper left corner; and
        (iv) a fourth inextensible cable that
            (A) has a first end mounted on said body adjacent said rear end of said body and adjacent said upper edge of said left internal sidewall;
            (B) has a second end mounted on said body adjacent said front end of said body, on or adjacent said internal floor, and adjacent said right internal sidewall; and
            (C) is trained over a seventh pulley mounted on said movable bulkhead adjacent its lower right corner and an eighth pulley mounted on said movable bulkhead adjacent its upper left corner.

2. A cargo carrying vehicle as recited in claim 1 wherein said movable bulkhead comprises:
    (a) a front portion that is generally planar in shape and that extends at least substantially from said left internal sidewall to said right internal sidewall and from said movable support surface upwardly;
    (b) a left gusset that extends from said front portion toward said rear end of said body adjacent said left internal sidewall; and (c) a right gusset that extends from said front portion toward said rear end of said body adjacent said right internal sidewall.

3. A cargo carrying vehicle as recited in claim 1 wherein said at lease one movable support surface makes planar abutting contact with said internal sidewalls.

4. A cargo carrying vehicle as recited in claim 1 wherein:
(a) when said at least one movable support surface is in its first position, its front end is adjacent said front end of said body and,
(b) when said at least one movable support surface is in its second position, its rear end is adjacent said rear end of said body.

5. A cargo carrying vehicle as recited in claim 1 wherein:
(a) when said movable bulkhead is in its first position, it is adjacent said front end of said body and,
(b) when said movable bulkhead is in its second position, it is adjacent said rear end of said body.

6. A cargo carrying vehicle as recited in claim 1 wherein a plurality of said movable support surfaces are mounted on said internal floor and spaced transversely of one another.

7. A cargo carrying vehicle as recited in claim 1 and further comprising a fourth means for temporarily anchoring said movable bulkhead in fixed position relative to said internal sidewalls.

8. A cargo carrying vehicle as recited in claim 1 wherein:
(a) said first inextensible cable is also trained over a second pulley mounted on said movable bulkhead adjacent its upper right corner;
(b) said second inextensible cable is also trained over a fourth pulley mounted on said movable bulkhead adjacent its upper right corner;
(c) said third inextensible cable is also trained over a sixth pulley mounted on said movable bulkhead adjacent its upper left corner; and
(d) said fourth inextensible cable is also trained over an eighth pulley mounted on said movable bulkhead adjacent its upper left corner.

9. A cargo carrying vehicle as recited in claim 8 wherein:
(a) said first and third pulleys are coaxial;
(b) said second and fourth pulleys are coaxial;
(c) said fifth and seventh pulleys are coaxial; and
(d) said sixth and eighth pulleys are coaxial.

10. A cargo carrying vehicle as recited in claim 1 wherein said body further comprises a roof.

11. A cargo carrying vehicle as recited in claim 1 and further comprising:
(a) at least one left movable support surface mounted on said left internal sidewall for movement relative thereto and
(b) at least one right movable support surface mounted on said right internal sidewall for movement relative thereto.

12. A cargo carrying vehicle as recited in claim 11 wherein:
(a) a plurality of said left movable support surfaces are mounted on said left internal sidewall and spaced vertically from one another and
(b) a plurality of said right movable support surfaces are mounted on said right internal sidewall and spaced vertically from one another.

13. A cargo carrying vehicle as recited in claim 1 wherein said at least one movable support surface is supported on said internal floor by means of rollers.

14. A cargo carrying vehicle comprising:
(a) a body having an interior, an internal floor, a left internal sidewall having an upper edge, a right internal sidewall having an upper edge, a longitudinal axis, a front end, and a rear end;
(b) a movable bulkhead mounted in said interior for movement relative to said internal floor, said movable bulkhead having an upper right corner, a lower right corner, an upper left corner, and a lower left corner;
(c) first means for moving said movable bulkhead back and fourth between a first position and a second position spaced longitudinally from said first position toward said rear end of said trailer body; and
(d) second means for stabilizing said movable bulkhead against pivotal movement relative to said internal sidewalls, said second means comprising:
(i) a first inextensible cable that:
(A) has a first end mounted on said body adjacent said rear end of said body, on or adjacent said internal floor, and adjacent said left internal sidewall;
(B) has a second end mounted on said body adjacent said front end of said body and adjacent said upper edge of said right internal sidewall; and
(C) is trained over a first pulley mounted on said movable bulkhead adjacent its lower left corner and a second pulley mounted on said movable bulkhead adjacent its upper right corner;
(ii) has a second inextensible cable that:
(A) has a first end mounted on said body adjacent said rear end of said body and adjacent said upper edge of said right internal sidewall;
(B) has a second end mounted on said body adjacent said first end of said body, on or adjacent said internal floor, and adjacent said left internal sidewall; and
(C) is trained over a third pulley mounted on said movable bulkhead adjacent its lower left corner and a fourth pulley mounted on said movable bulkhead adjacent its upper right corner;
(iii) a third inextensible cable that:
(A) has a first end mounted on said body adjacent said rear end of said body, on or adjacent said internal floor, and adjacent said right internal sidewall;
(B) has a second end mounted on said body adjacent said front end of said body and adjacent said upper edge of said left internal sidewall; and
(C) is trained over a fifth pulley mounted over said movable bulkhead adjacent its lower right corner and a sixth pulley mounted on said movable bulkhead adjacent its upper left corner; and
(iv) a fourth inextensible cable that:
(A) has a first end mounted on said body adjacent said rear end of said body and adjacent said upper edge of said left internal sidewall;
(B) has a second end mounted on said body adjacent said front end of aid body, on or adjacent said internal floor, and adjacent said right internal sidewall; and (C) is trained over a seventh pulley mounted on said movable bulkhead adjacent its lower right corner and an eighth pulley mounted on said movable bulkhead adjacent its upper left corner.

15. A cargo carrying vehicle as recited in claim 14 wherein:
   (a) said first and third pulleys are coaxial;
   (b) said second and fourth pulleys are coaxial;
   (c) said fifth and seventh pulleys are coaxial; and
   (d) said sixth and eighth pulleys are coaxial.

16. A cargo carrying vehicle as recited in claim 14 wherein said body further comprises a roof.

17. A cargo carrying vehicle as recited in claim 14 wherein said movable bulkhead comprises:
   (a) a front portion that is generally planar in shape and that extends at least substantially from said left internal sidewall to said right internal sidewall and from said movable support surface upwardly;
   (b) a left gusset that extends from said front portion toward said rear end of said body adjacent said left internal sidewall; and
   (c) a right gusset that extends from said front portion toward said rear end of said body adjacent said right internal sidewall.

18. A cargo carrying vehicle as recited in claim 14 wherein:
   (a) when said movable bulkhead is in its first position, it is adjacent said front end of said body and
   (b) when said movable bulkhead is in its second position, it is adjacent said rear end of said body.

19. A cargo carrying vehicle as recited in claim 14 and further comprising third means for temporarily anchoring said movable bulkhead in fixed position relative to said internal sidewalls.

20. A cargo carrying vehicle comprising:
   (a) a body having an interior, an internal floor, a left internal sidewall, a right internal sidewall, a longitudinal axis, a front end, and a rear end;
   (b) at least one movable support surface mounted on said internal floor for movement relative thereto, said movable support surface having a front end and a rear end;
   (c) first means for moving said movable support surface back and forth between a first position and a second position spaced longitudinally from said first position towards said rear end of said body;
   (d) a movable bulkhead mounted in said interior above said movable support surface for movement relative to said internal floor;
   (e) second means for moving said movable bulkhead back and forth between a first position and a second position spaced longitudinally from said first position towards said rear end of said body; and
   (f) third means for stabilizing said movable bulkhead against pivotal movement relative to said internal sidewalls, said third means comprising at last two inextensible cables each of which:
      (i) has a first end mounted on said body adjacent said rear end of said body;
      (ii) has a second end mounted on said body adjacent said front end of said body;
      (iii) passes through said movable bulkhead but is not attached to said movable bulkhead; and
      (iv) prevents pivotal movement of said movable bulkhead about one axis.

21. A cargo carrying vehicle as recited in claim 20 wherein said movable bulkhead engages each of said at least two inextensible cables at two points spaced from each other relative to the longitudinal axis of said body.

22. A cargo carrying vehicle as recited in claim 20 wherein said movable bulkhead comprises:
   (a) a front portion that is generally planar in shape and that extends at least substantially from said left internal sidewall to said right internal sidewall and from said at least one movable support surface upwardly;
   (b) a left gusset that extends from said front portion towards said rear end of said body adjacent said left internal sidewall; and
   (c) a right gusset that extends from said front portion towards said rear end of said body adjacent said right internal sidewall.

23. A cargo carrying vehicle as recited in claim 20 wherein said at least one movable support surface makes planar abutting contact with said internal sidewalls.

24. A cargo carrying vehicle as recited in claim 20 wherein:
   (a) when said at least one movable support surface is in its first position, its front end is adjacent said front end of said body; and
   (b) when said at least one movable support surface is in its second position, its rear end is adjacent said rear end of said body.

25. A cargo carrying vehicle as recited in claim 20 wherein:
   (a) when said movable bulkhead is in its first position, it is adjacent said front end of said body; and
   (b) when said movable bulkhead is in its second position, it is adjacent said rear end of said body.

26. A cargo carrying vehicle as recited in claim 20 wherein a plurality of said movable support surfaces are mounted on said internal floor and spaced transversely of one another.

27. A cargo carrying vehicle as recited in claim 20 and further comprising a fourth means for temporarily anchoring said movable bulkhead in fixed position relative to said internal sidewalls.

28. A cargo carrying vehicle as recited in claim 20 wherein said body further comprises a roof.

29. A cargo carrying vehicle as recited in claim 20 and further comprising:
   (a) at least one left movable support surface mounted on said left internal sidewall for movement relative thereto and
   (b) at least one right movable support surface mounted on said right internal sidewall for movement relative thereto.

30. A cargo carrying vehicle as recited in claim 29 wherein:
   (a) a plurality of said left movable support surfaces are mounted on said left internal sidewall and spaced vertically from one another and
   (b) a plurality of said right movable support surfaces are mounted on said right internal sidewall and spaced vertically from one another.

31. A cargo carrying vehicle as recited in claim 20 wherein said at least one movable support surface is supported on said internal floor by means of rollers.

* * * * *